United States Patent [19]
Shimada

[11] Patent Number: 5,640,171
[45] Date of Patent: Jun. 17, 1997

[54] IMAGE DISPLAY SYSTEM

[75] Inventor: Naoto Shimada, Hachioji, Japan

[73] Assignee: Olympus Optical Company, Ltd., Tokyo, Japan

[21] Appl. No.: 521,227

[22] Filed: Aug. 30, 1995

[30] Foreign Application Priority Data

Sep. 6, 1994 [JP] Japan .................... 6-212714

[51] Int. Cl.$^6$ ..................... G09G 5/00
[52] U.S. Cl. ................. 345/8; 345/9; 348/51; 348/53
[58] Field of Search ................. 345/6, 7, 8, 9, 345/139; 348/51, 52, 53, 54, 55, 56, 57, 58, 59, 60; 359/471, 477, 480, 481, 482, 630, 631, 632

[56] References Cited

U.S. PATENT DOCUMENTS

| | | | |
|---|---|---|---|
| 4,651,201 | 3/1987 | Schoolman | 348/45 |
| 5,357,277 | 10/1994 | Nakayoshi et al. | 348/55 |
| 5,523,886 | 6/1996 | Johnson-Williams | 348/52 |

*Primary Examiner*—Mark R. Powell
*Assistant Examiner*—Matthew Luu

[57] ABSTRACT

An image display device having liquid crystal panels separately in right and left sides of a viewer, and capable of performing a common video signal display (2D display) and a stereoscopic display in field sequentially, is disclosed. The device comprises: a display mode switching unit for switching the above two display modes; an adjusting value switching unit for switching the adjusting value to a value set every display mode in synchronization with the display mode switching unit; and an image signal processing unit for processing image signals for various image qualities of the image signals in accordance with the adjusting value from the display mode switching unit; thereby displaying the image display signal subjected to the image signal processing suitable for respective display modes on respective image display elements. The device comprises an image holding unit for holding previous image by one field on the image display element, in which the image signals to be displayed is not inputted, of the image display elements provided separately at right and left sides of a viewer at the switching to stereoscopic display mode.

4 Claims, 5 Drawing Sheets

FIG._1

FIG_2

IMAGE DISPLAY SYSTEM

BACKGROUND OF THE INVENTION

1. Field of the Invention

The present invention relates to an image display device capable of displaying a stereoscopic image by leading different images to right and left eyes of a viewer.

2. Related Art Statement

As a conventional example of the image display device capable of displaying a stereoscopic image, for example, there is an image display device disclosed in Japanese Patent Laid Open No. 103,349/93. In this conventional image display device, when images (left eye image and right eye image) supplied in field sequence are displayed alternately on image display elements provided separately by right and left sides, if for example, the images displayed with a rate of 60 images/sec are used, the half thereof, that is, 30 images/sec are only displayed, so that the frames which are not displayed become a half of the whole frames, resulting in an occurrence of flicker. For this problem following countermeasure is taken.

That is, a liquid crystal display (LCD) used as an image display device has an effect for holding the image in case of adding charges between the electrodes of the liquid crystal and of holding the charges as it is, so as not to discharge the charges. This effect is referred to as "a memory effect of liquid crystal". In this conventional example, this memory effect of liquid crystal is utilized to hold the previous image in the frames, in which the images are not inputted, so that the images displayed with a rate of 60 images/sec are realized so as to prevent the flicker from being caused in the right and left LCDs.

In the above conventional example, however, the flicker is rendered to prevent by only the memory effect of liquid crystal as described above, so that, indeed, only the memory effect of liquid crystal can not remove the flicker sufficiently, and thus the remained flicker becomes remarkable, and the contrast decreases, resulting in a deterioration of image quality.

SUMMARY OF THE INVENTION

It is an object of the present invention to eliminate the above described disadvantages of the conventional image display device.

It is another object of the present invention to provide an image display device capable of displaying images with high image quality and flicker-less for viewer, by subjecting the image to be displayed to adjustment for various kinds of image qualities.

According to the present invention, there is provided an image display device having liquid crystal panels separately in right and left sides of a viewer, and capable of performing a common video signal display (2D display) and a stereoscopic display in field sequentially, the device comprising:

a display mode switching means for switching the above two display modes;

an adjusting value switching means for switching the adjusting value to a value set every display mode in synchronized with the display mode switching means; and an image signal processing means for processing image signals for various image qualities for the image signals in accordance with the adjusted value from the display mode switching means, thereby displaying the image display signal subjected to the image signal processing suitable for respective display systems.

According to the present invention, it is preferred that the adjusting value switching is performed every each adjusting value for contrast, bright and gamma corrections, respectively. In this case, particularly, large difference is present between the field sequential stereoscopic display mode (3D) and the standard display mode (2D), so that it is preferable to limit the adjusting items to the above three items, in order to simplify the adjustment and to make the circuit scale compact.

In order to switch the adjusting values with simple circuit construction, moreover, it is preferable to perform the switching of the adjusting values by switching two kinds of analog voltages.

It is preferable to switch the adjusting values by the switching of the digital signals, since the data for the adjusting values can be switched by overwriting with the use of microcomputer or the like, thereby performing fine or delicate adjustment, and to utilize various kinds of data by accommodating a micro-computer in the device and further to set to an adjustment value suitable with the contents of the image software even in the same display mode.

The field number per one second is different between the case of performing the field sequential stereoscopic display with the memorizing effect and the case of performing the standard display (2D display), so that the image quality becomes different in case of performing the image display with the same conditions.

The image display device further comprises an image holding means for holding previous image by one field on the image display element which is not inputted by the image signals to be displayed, of the image display element provided separately at right and left sides at the switching of stereoscopic display mode.

In the present invention, when a stereoscopic image is displayed on image display elements provided separately in right and left sides of a viewer with a field sequential stereoscopic display mode, a display mode switching means switches the above display mode from the standard display mode to the field sequential stereoscopic display mode, an adjusting value switching means switches the adjusting value to a value set every display mode in synchronized with the display mode switching means, an image signal processing means processes image signals for various image qualities for the image signals in accordance with the adjusted value supplied from the adjusted value switching means, and an image holding means holds previous image by one field on the image display element, on which the image signals to be displayed is not inputted, of the image display elements provided separately at right and left sides at the switching of stereoscopic display modes, so that the image signal subjected to the image signal processing suitable for the field sequential stereoscopic display mode is displayed, and thus field sequential stereoscopic image display can be performed with flicker-less and with high image quality.

When a plane image is displayed in image display elements provided separately in right and left sides of a viewer with a standard display mode, the display mode switching means switches the above display mode from the field sequential stereoscopic display mode to the standard display mode, the adjusting value switching means switches the adjusting value to a value set every display mode in synchronized with the display mode switching means, the image signal processing means processes image signals for various image qualities for the image signals in accordance with the adjusted value supplied from the adjusted value switching means, so that the image signal subjected to the image signal processing suitable for the standard display mode is displayed, and thus plain image display can be performed with flicker-less and with high image quality.

DETAILED EXPLANATION OF THE PREFERRED EMBODIMENT

Figure 1:
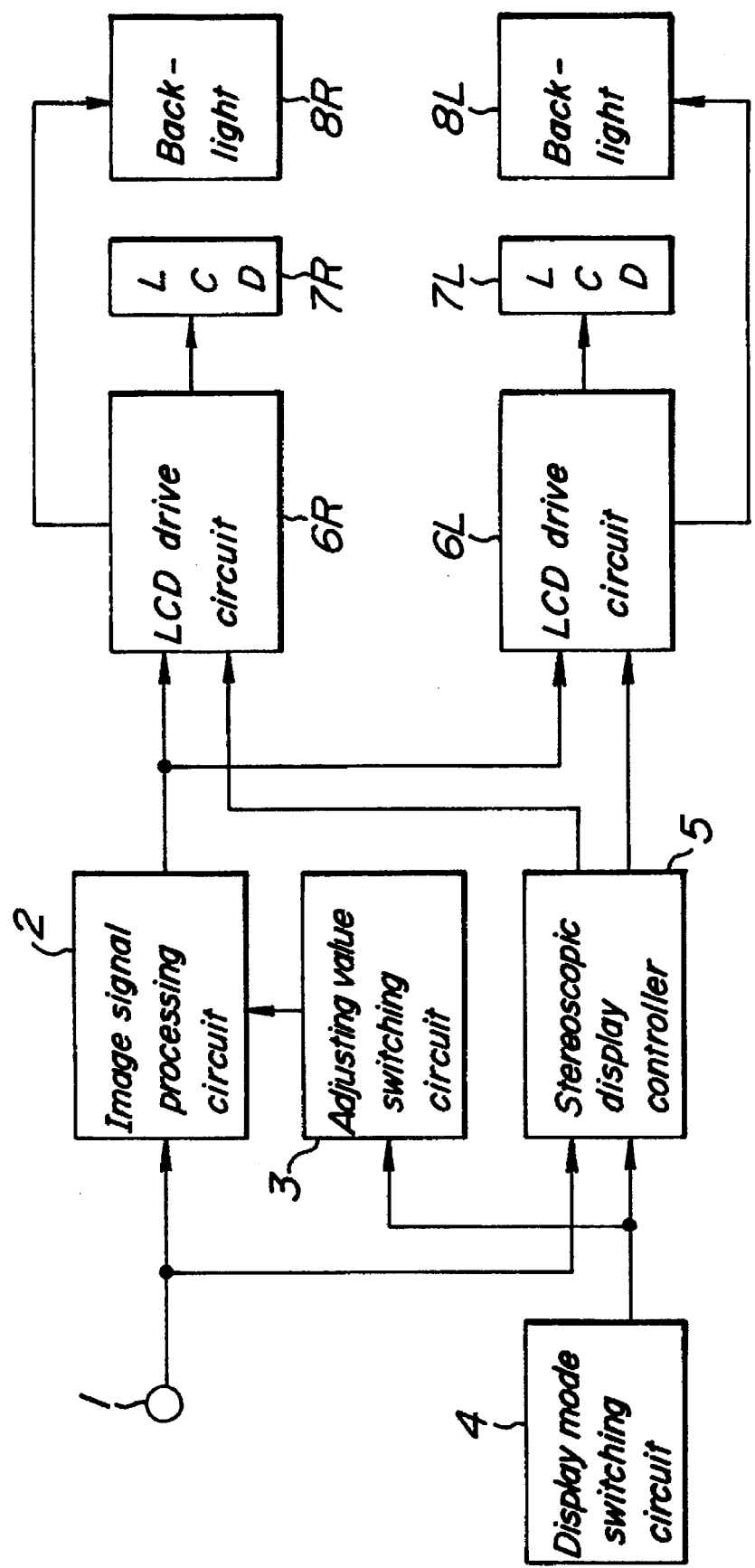
FIG. 1 is an explanatory view showing the construction of first embodiment of an image display device according to the present invention.

Now to the drawings, there are shown various embodiments of an image display device according to the present invention. Like parts are shown by corresponding reference characters throughout several views of the drawings. FIG. 1 is a block diagram showing a construction of an image display device according to the present invention. In the image display device of this embodiment, an image signal input terminal 1 is connected to one input terminal of an image signal processing circuit 2 and one input terminal of a stereoscopic display controller 5, respectively, a display mode switching circuit 4 is connected to the input terminal of an adjusted value switching circuit 3 and the other input terminal of the stereoscopic display controller 5, the output terminal of the adjusting value switching circuit 3 is connected to the other input terminal of the image signal processing circuit 2, the output terminal of the image signal processing circuit 2 and the output terminal of the stereoscopic display controller 5 are connected to the input terminals of the LCD driving circuits 6R and 6L, respectively, and the outputs of the LCD drive circuits 6L, 6R are connected to back-lights 8R, 8L, respectively.

Figure 2:
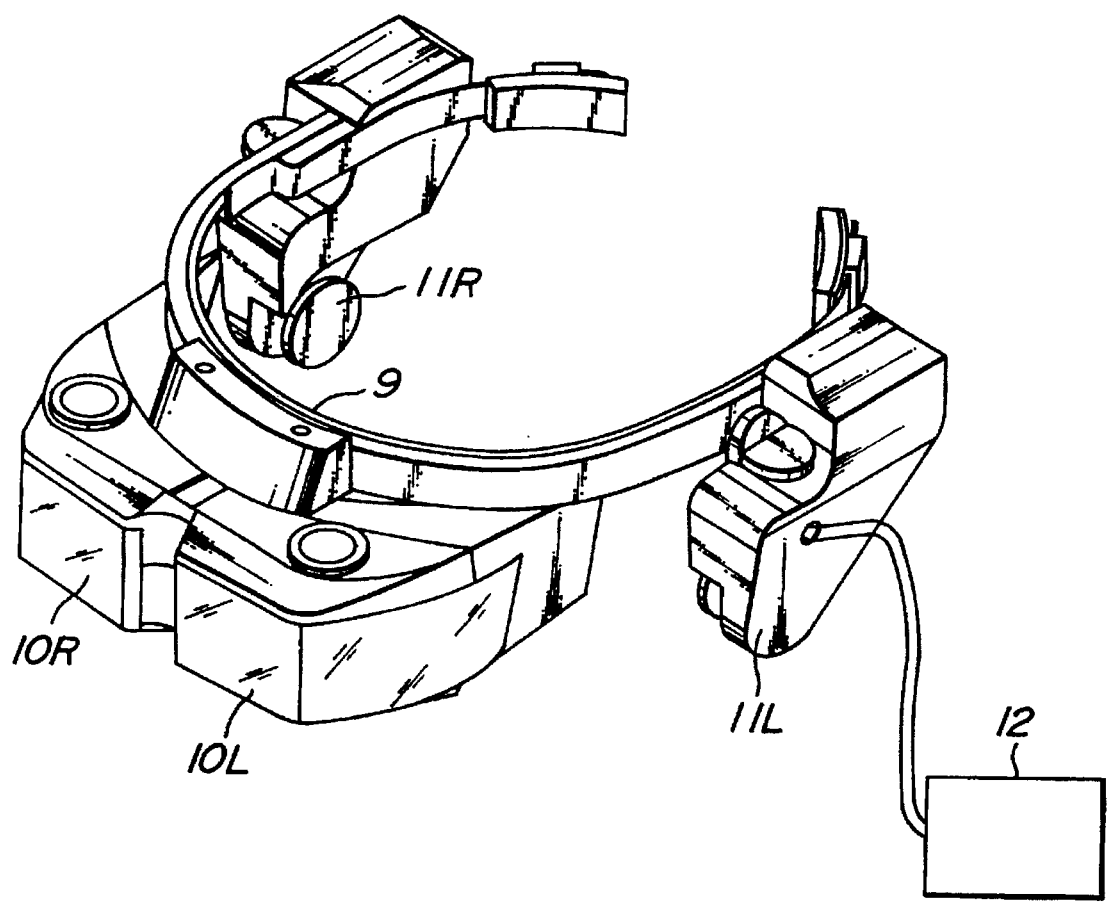
FIG. 2 is a perspective view showing one embodiment of outline of the image display device according the present invention.

FIG. 2 shows a perspective view showing one embodiment of outline of the image display device shown in the first embodiment. In FIG. 2, reference numeral 9 is a U shaped mounting unit for securing a head-mounted device (HMD) on a head of a viewer. The U shaped mounting unit 9 carries display units 10R, 10L including LCDs 7R, 7L and back lights 8R, 8L, and loud speaker units 11R, 11L for regenerating voice signals included in an image software, and the loud speaker units 11R, 11L are connected to a controller 12 (including a power supply source) for controlling the HMD of the present embodiment. Respective circuits shown in FIG. 1 are distributed and arranged in respective units forming the HMD of this embodiment.

Figure 3:
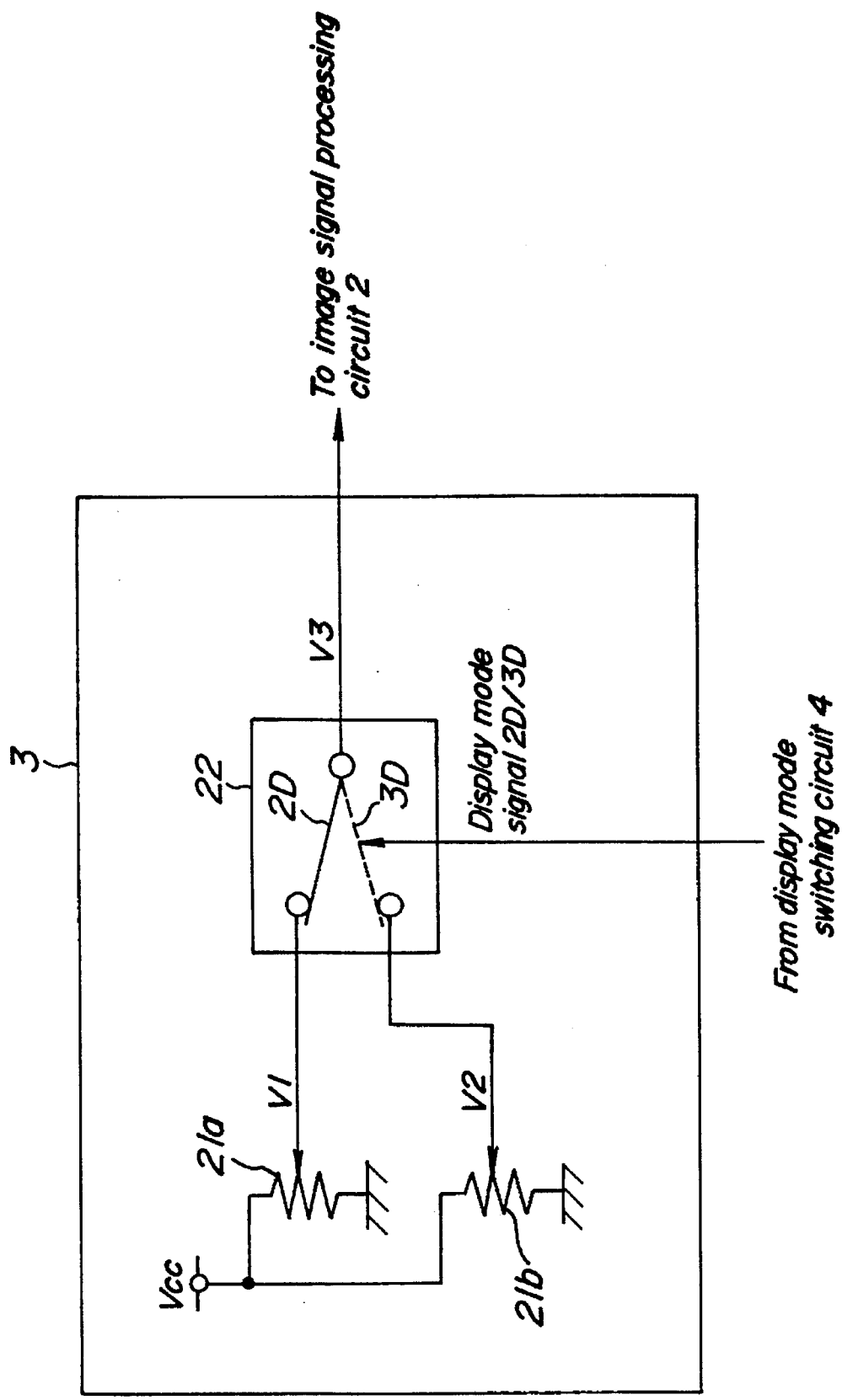
FIG. 3 is a detailed explanatory view showing an adjusted value switching circuit of the image display device of the first embodiment according to the present invention.

FIG. 3 is a detailed explanatory view showing an adjusting value switching circuit of an image display device of the first embodiment. This adjusting value switching circuit comprises a standard display trimmer 21a for adjusting the applied voltage VCC to a predetermined voltage V1, a field sequential stereoscopic display mode trimmer 21b for adjusting the applied voltage VCC to a predetermined voltage V2 and a switch circuit 22 for supplying one of the applied voltages V1, V2 selected as an adjusting value V3 in accordance with a display mode signal 2D/3D inputted from the display mode switching circuit 4, to the image signal processing circuit 2, and the switch circuit 22 is formed by a photo-MOS relay, analog switch or the like. In this case, the construction shown in FIG. 3 is necessary as to one of adjusting items for various image qualities such as a contrast, a bright, a gamma correction or the like, so that if it is necessary to adjust the above three items, three sets of the constructions shown in FIG. 3 have to provide in the adjusting value switching circuit 3.

Then, the effect of the first embodiment is explained as follows.

The image signals (for example, video signals) inputted from the image signal input terminal 1 is supplied to the image signal processing circuit 2 and the stereoscopic display controller 5. While in the display mode switching circuit 4, switches (not shown) or the like are operated and the necessary display mode is selected from the standard display mode (2D) and the field sequential stereoscopic display mode (3D), so that the display mode signal (2D or 3D) being, for example, a high level signal in the case of 2D, and a low level signal in the case of 3D, is supplied to the adjusting value switching circuit 3 and the stereoscopic display controller 5. Hereinafter, the cases of selecting the standard display mode and the field sequential stereoscopic display mode are explained.

At first, in case of selecting the standard display mode, the adjusting value switching circuit 3 switches the switch circuit 22 as shown by solid line in FIG. 3 in accordance with the inputted display mode signal 2D, so that the voltage V1 corresponding to the standard mode is applied to the image signal processing circuit 2 as an adjusting value V3. In this case, in the image signal processing circuit 2, the image signal is subjected to the image signal processing based on the adjusted value V3 as to one of adjusting items for the image quality. Such an image signal processing is performed as to whole of the set adjusting items, and in FIG. 3, three items of contrast, bright and gamma correction of the adjusting items, such as contrast, bright, gamma correction, color concentration, hue, edge enhancement, white balance, or the like.

After the image signal processing, the image signal is supplied to the LCD drive circuits 6R, 6L. In this case, the stereoscopic display controller, to which the display mode signal 2D is supplied, generates a control signal, by which LCDs 6R, 6L are made always writing mode (W), so that LCD drive circuits 6R, 6L generate image signal after image signal processing to LCDs 7R, 7L, as it is. LCDs 7R, 7L display the image signal subjected to the image signal processing suitable for standard display in both odd field and even field.

Then, in case of selecting the field sequential stereoscopic display mode, the adjusting value switching circuit 3 switches the switch circuit 22 as shown by dotted line in FIG. 3 in accordance with the inputted display mode signal 3D, so that the voltage V2 corresponding to the field sequential stereoscopic display mode is applied to the image signal processing circuit 2 as an adjusting value V3. In this case, in the image signal processing circuit 2, the image signal is subjected to the image signal processing based on the adjusted value V3 as to one of adjusting items for the image quality. Such an image signal processing is performed in FIG. 3, as to three items of contrast, bright and gamma correction of the adjusting items, respectively.

After the image signal processing, the image signal is supplied to the LCD drive circuits 6R, 6L. In this case, the stereoscopic display controller 5, to which the display mode signal 3D is supplied, generates two kinds of control signals by discriminating whether the field of the image signal is odd or even by a synchronous separator accommodated in the controller 5. These control signals are supplied to the LCD drive circuits 6R, 6L, and serve as in such a manner that for example, in the case of odd field, LCD 7R is made writing mode (W) and LCD 7L is made holding mode (H) as well as in the case of even field, LCD 7R is made holding mode (H) and LCD 7l is made writing mode (W).

In the LCD driving circuits 6R, 6L, to which the control signal is supplied, right eye image signals are supplied to LCD 7R as it is, (and left eye image signals are supplied to LCD 7L as it is), in the case of writing mode, that is, in the case of field, in which right image signals are supplied to the right LCD 7R (and in the case of field, in which left eye image signals are supplied to the left LCD 7L), and the right eye image signal of previous field is held and outputted to the LCD 7R (and the left eye image signal of previous field is held and outputted to the LCD 7L), in the case of holding mode, that is, in the case of field, in which right eye image signal is not supplied to the right LCD 7R (but supplied to the left LCD 7L) (and the left eye image signal is not supplied to the left LCD 7L (but supplied to the right LCD 7R)). In the LCDs 7R, 7L, the image signals subjected to the image signal processing suitable for field sequential stereoscopic display are displayed in both odd and even fields.

In case of displaying the stereoscopic image software field-sequentially and stereoscopically, in the conventional example of Japanese Patent Application Laid Open No. 103,349/93, the flicker is caused in case of becoming the number of field of image displayed on one LCD half of whole field number (for example, 30 images/sec in the case of whole of 60 images/sec in maximum). This flicker can be prevented by making the number of field of the image two fold with the use of the memorizing effect of liquid crystal, but in this case, the image quality is degraded as compared with normal display.

On the contrary, in this embodiment, when for example, the stereoscopic image software formed so as to correspond, for example, odd field to right eye image and even field to left eye image, is displayed field-sequentially and stereoscopically, in the image signal processing circuit 2, the image signal is subjected to the image signal processing by using the adjusted value suitable for field sequential stereoscopic display as to adjusting items for the various image quality, thereby displaying the image with the use of the memorizing effect of the liquid crystal, so that the deterioration of the image quality can be suppressed as in the above conventional example.

In order to display the image by the image signal subjected to the image signal processing using the adjusted value suitable for the standard display in the case of standard display, and the image signal subjected to the image signal processing using the adjusted value suitable for field sequential display in the case of field sequential stereoscopic display, the adjusted value in connection with the various image quality of the image signal processing section 2 is changed, so that the image display having good image quality can be performed in both display modes.

When LCD of normal white is used as LCDs 7R, 7L, the adjusting value of contrast and bright at field sequential stereoscopic display is preferable to use value to be adjusted so as to make the contrast low and to make the brightness dark as compared with the standard display.

In FIG. 1, a set of the image signal processing circuit 2 and the adjusting value switching circuit 3 is provided so as to correspond them to the right and left LCD drive circuits 6R, 6L, but if these image signal processing circuit 2 and adjusting value switching circuit 3 are provided separately at right and left sides so as to correspond them to the right and left LCD drive circuits 6R, 6L, it is possible to perform adjustment for the image quality more favorably.

In the above embodiment, also, the field sequential stereoscopic display is performed by using the stereoscopic image software formed so as to correspond the odd field to right eye image, and to correspond the even field to left eye image, so that it is preferable to provide switches or the like in the stereoscopic display controller 5.

In the above embodiment, moreover, the standard display mode and the field sequential stereoscopic display mode are switched by operating switches or the like in the display mode switching circuit 4, but it may be preferable to output the display mode signals automatically by detecting an identifying signal for stereoscopic display (3D) or standard display (2D) recorded on the image software.

Figure 4:
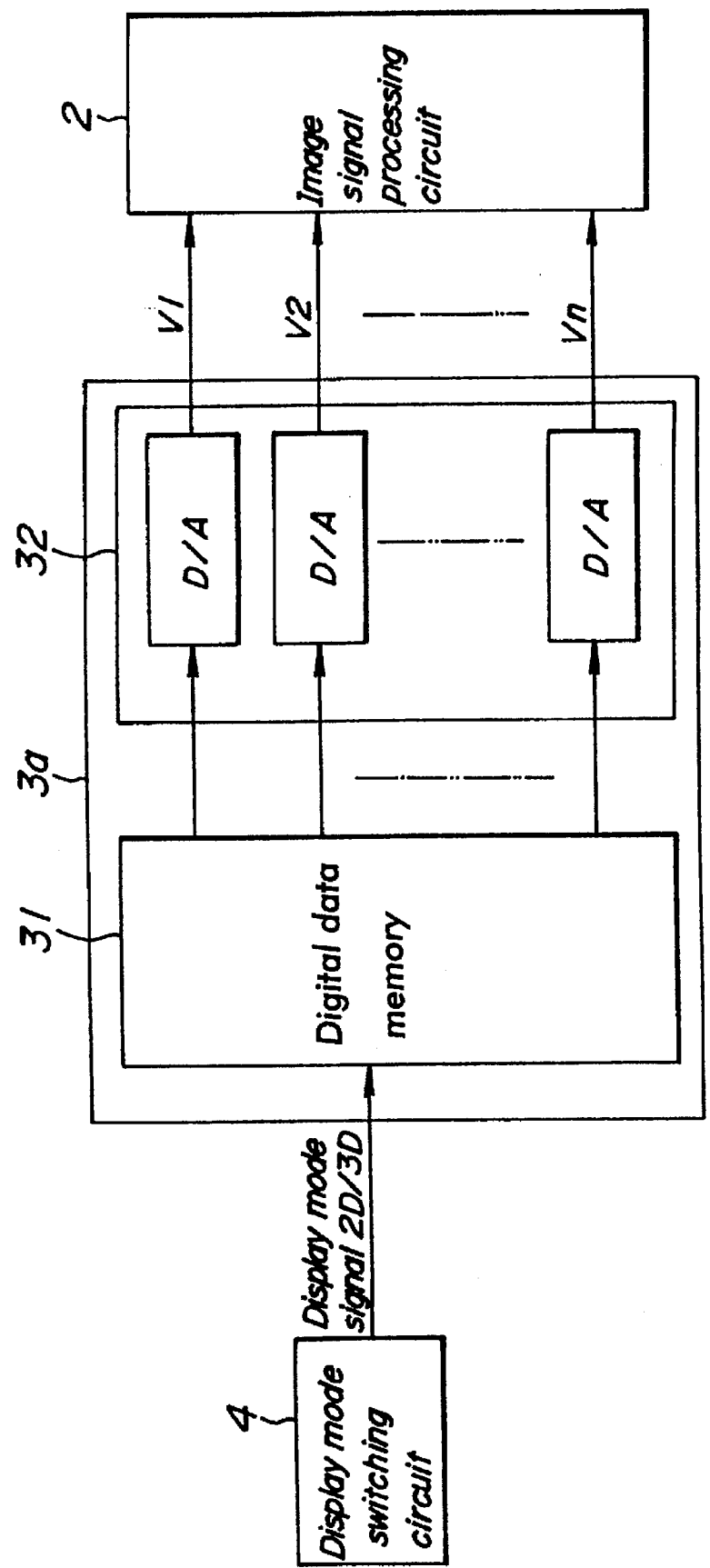
FIG. 4 is a detailed explanatory view showing plan view showing second embodiment of the image display device according to the present invention.

FIG. 4 is a detailed explanatory view of the adjusting value switching circuit in the image display device of a second embodiment according to the present invention. In the second embodiment, an adjusting value switching circuit 3a for switching the adjusted value of respective adjusting items by digital signals instead of the adjusting value switching circuit 3 used in the first embodiment. The other portions thereof is constructed as in the same manner as the first embodiment, so that its detailed explanation is omitted.

An adjusting value switching circuit 3a shown in FIG. 4 comprises a digital data memory 31 formed with EEPROM, and a data conversion units 32 consisting of a plurality of D/A converters.

In the second embodiment, when a display mode signal (3D/2D) is supplied to the digital date memory 31 provided in the adjusting value switching circuit 3a from the display mode switching circuit 4, the data of corresponding display mode are selected to supply them to D/A converters of the data conversion unit 32, thereby converting them into analog data which are supplied to the image signal processing circuit 2, since data corresponding to two display modes of the standard display and the field sequential stereoscopic display (for example digital signal of few bits) are previously stored in the digital data memory 31.

According to the adjusting value switching system of the second embodiment, in the case of the display mode being the standard display mode, the image quality of the image displayed on the LCD can be adjusted so as to become suitable for the standard display mode, and in the case of the display mode being the field sequential stereoscopic display mode, the image quality of the image displayed on the LCD can be adjusted so as to become suitable for the field sequential stereoscopic display mode.

Moreover, according to the adjusting value switching system of the second embodiment, it is possible to store whole data of the adjusting items such as contrast, bright, gamma correction, color concentration, hue, edge enhancement, white balance, or the like, and to store more than two kinds of data every adjusting items, by making the memory capacity of the digital data memory adequately large and by making adjusting items increased, as well as to store not only data corresponding to the display mode, but also data corresponding to contents of the image software, so that improvement of image quality can be performed by switching the adjusting value in accordance with the image software to be displayed.

Figure 5:
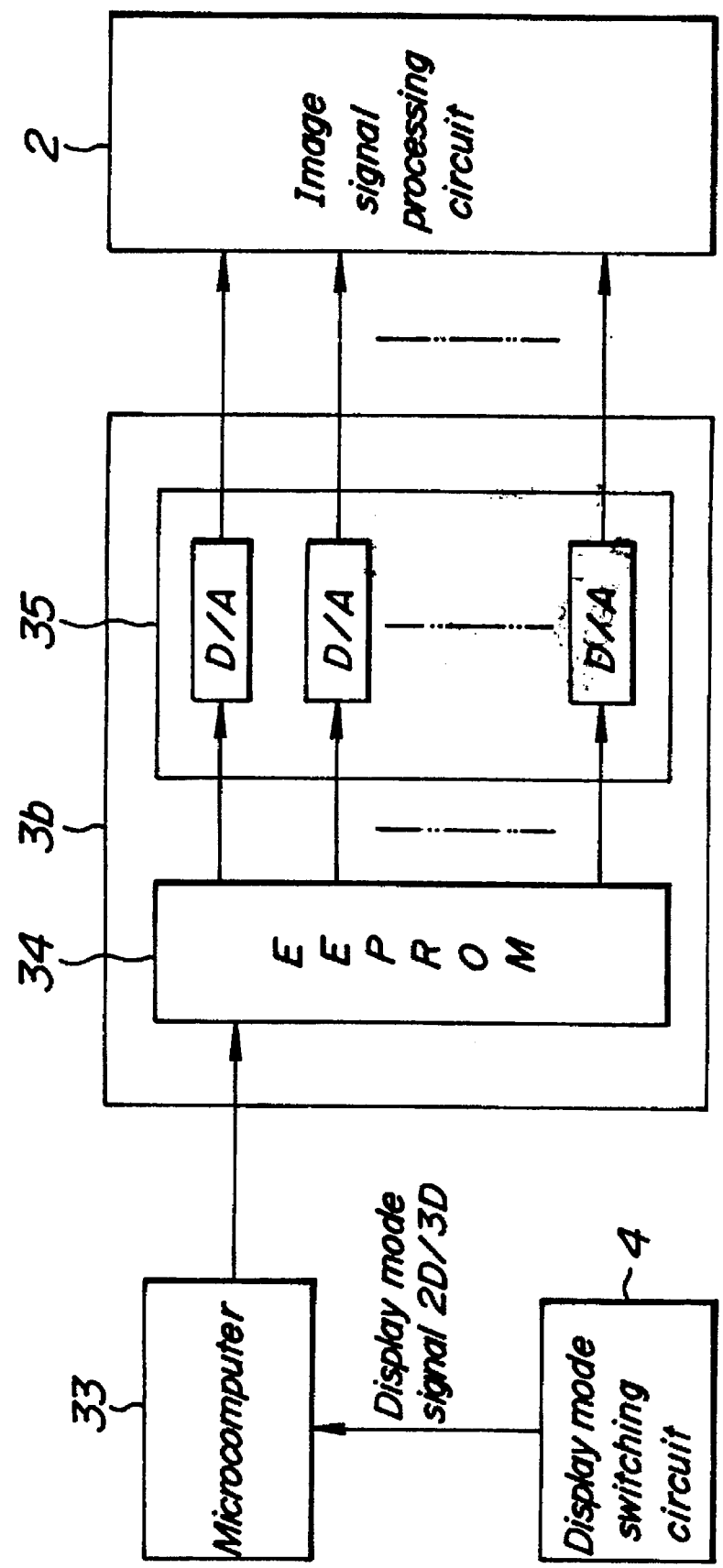
FIG. 5 is a detailed explanatory view showing plan view showing second embodiment of the image display device according to the present invention.

FIG. 5 is a detailed explanatory view of the adjusting value switching circuit of a third embodiment of the image display device according to the present invention. In the third embodiment, an adjusting value switching circuit 3b of an electronic volume IC is used instead of the adjusting value switching circuit 3 used in the first embodiment, a micro-computer 33 is provided between the display mode switching circuit 4 and the adjusting value switching circuit 3b. The other portion thereof is the same as that of the first embodiment, so that its detailed explanation is omitted.

The adjusting value switching circuit 3b shown in FIG. 5 is constructed by an electronic volume comprising an EEPROM 34 for storing digital data corresponding to respective adjusting items, and a data converting unit 35 consisting of a plurality of D/A converters. In this embodiment, EEPROM is used as it is, so that one data every respective D/A converters is stored in the EEPROM 34.

In the third embodiment, when the display mode signal (3D/2D) is supplied to the micro-computer 33 from the display mode switching circuit 4, the micro-computer 33 writes in the EEPROM 34 data corresponding to either one of the standard display mode and the field sequential stereoscopic display mode (for example, digital signal of few bits) for respective adjusting items. This data is supplied to D/A converters of the data conversion unit 32, and converted into an analog voltage value and then supplied to the image signal processing circuit 2. When the display mode is switched, the data can be switched by over-writing the data corresponding to said display mode.

According to the adjusting value switching system of the third embodiment, in the case of the display mode being the standard display mode, the image quality of the image displayed on the LCD can be adjusted so as to become suitable for the standard display mode, and in the case of the display mode being the field sequential stereoscopic display mode, the image quality of the image displayed on the LCD can be adjusted so as to become suitable for the field sequential stereoscopic display mode.

According to the adjusting value switching system of the third embodiment, also, the electronic volume IC is used, so that the adjusting value switching circuit can be made compact.

According to the adjusting value switching system of the third embodiment, moreover, the data of adjusting value is written from the micro-computer 33, so that the memory capacity of the EEPROM 34 can be made small rather than that of the second embodiment.

The micro-computer 33 may be provided outside the adjusting value switching circuit 3, which may be controlled from outside thereof. In this case, a personal computer may be used instead of the microcomputer.

In the above respective embodiments, the number of images to be displayed on right and left LCDs is increased with the use of memorizing effect of the liquid crystal. However, instead of utilization of the memory effect of liquid crystal, a field memory circuit for storing the image of previous field in the case of field, in which the image is not inputted, is provided, and the image stored in the field memory circuit may be displayed in the field, in which the image is not inputted.

What is claimed is:

1. An image display device having liquid crystal panels provided separately in right and left sides of a viewer, and capable of performing a normal video signal display (2D display) and a field sequential stereoscopic display, the device comprising:

a display mode switching means for switching the above two display modes;

an adjusting value switching means for switching the adjusting value to a value set every display mode in synchronization with the display mode switching means; and an image signal processing means for processing image signals for various image qualities of the image signals in accordance with the adjusting value from the display mode switching means, thereby displaying the image display signal subjected to the image signal processing suitable for respective display modes on respective image display elements.

2. An image display device as claimed in claim 1, wherein the adjusting value switching is performed for respective adjusting values for correcting contrast, bright (brightness) and gamma correction.

3. An image display device as claimed in claim 1, wherein the adjusting value switching is performed by the switching of two kinds of analog voltage values.

4. An image display device as claimed in claim 1, wherein the adjusting value switching is performed by switching analog voltage values with the use of D/A converter.

* * * * *